(12) United States Patent
Jeon et al.

(10) Patent No.: US 9,933,665 B2
(45) Date of Patent: Apr. 3, 2018

(54) LIQUID CRYSTAL DISPLAY DEVICE

(71) Applicant: LG DISPLAY CO., LTD., Seoul (KR)

(72) Inventors: Saet Byeol Jeon, Daejeon (KR); Jong Wook Jung, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 64 days.

(21) Appl. No.: 14/826,955

(22) Filed: Aug. 14, 2015

(65) Prior Publication Data

US 2016/0085105 A1    Mar. 24, 2016

(30) Foreign Application Priority Data

Sep. 18, 2014 (KR) ........................ 10-2014-0124590

(51) Int. Cl.
*G02F 1/1337* (2006.01)
*G02F 1/1339* (2006.01)
*G02F 1/1335* (2006.01)
*G02F 1/1362* (2006.01)

(52) U.S. Cl.
CPC ........ *G02F 1/13394* (2013.01); *G02F 1/1337* (2013.01); *G02F 1/133512* (2013.01); *G02F 1/136286* (2013.01); *G02F 2001/13396* (2013.01); *G02F 2001/13398* (2013.01); *G02F 2201/50* (2013.01)

(58) Field of Classification Search
CPC ........... G02F 1/13394; G02F 1/133512; G02F 1/1337
USPC ........................................... 349/129
See application file for complete search history.

(56) References Cited

U.S. PATENT DOCUMENTS

| 6,097,467 A | * | 8/2000 | Fujimaki ............. G02F 1/13394 349/155 |
| 6,339,462 B1 | * | 1/2002 | Kishimoto .......... G02F 1/13394 349/156 |
| 6,433,852 B1 | | 8/2002 | Sonoda et al. |
| 2005/0052607 A1 | * | 3/2005 | Mori ................... G02F 1/13394 349/155 |
| 2006/0001825 A1 | | 1/2006 | Choi et al. |
| 2006/0290860 A1 | * | 12/2006 | Lee ...................... G02F 1/13394 349/139 |
| 2010/0053536 A1 | | 3/2010 | Sato et al. |
| 2012/0138941 A1 | | 6/2012 | Ku et al. |
| 2012/0314178 A1 | | 12/2012 | Doi et al. |
| 2013/0010238 A1 | | 1/2013 | Chen et al. |
| 2013/0235294 A1 | | 9/2013 | Nomura |
| 2015/0340400 A1 | * | 11/2015 | Takemoto ......... H01L 27/14634 257/448 |

FOREIGN PATENT DOCUMENTS

| CN | 1716066 A | 1/2006 |
| CN | 102819149 A | 12/2012 |
| CN | 103309091 A | 9/2013 |
| CN | 104020605 A | 9/2014 |

* cited by examiner

*Primary Examiner* — Lucy Chien
(74) *Attorney, Agent, or Firm* — Dentons US LLP

(57) ABSTRACT

Disclosed is a liquid crystal display device that includes first and second substrates; a liquid crystal layer between the first and second substrates; first and second bumps on the first substrate; and at least one first protrusion facing the first bump, and at least one second protrusion facing the second bump, the first and second protrusions being on the second substrate, wherein the first protrusion faces one side of the first bump, and the second protrusion faces the other side of the second bump.

18 Claims, 16 Drawing Sheets

LIQUID CRYSTAL DISPLAY DEVICE

CROSS REFERENCE TO RELATED APPLICATIONS

This application claims the benefit of Korean Patent Application No. 10-2014-0124590 filed on Sep. 18, 2014, which is hereby incorporated by reference for all purposes as if fully set forth herein.

BACKGROUND OF THE INVENTION

Field of the Invention

Embodiments of the present invention relate to a liquid crystal display device. More particularly, the embodiments relate to a column spacer for maintaining a cell gap of a liquid crystal display device.

Discussion of the Related Art

Owing to advantages such as good portability and low power consumption by low operating voltage, a liquid crystal display (LCD) device is widely used in various fields of notebook computer, monitor, spacecraft, aircraft, and etc.

The LCD device includes a lower substrate with a thin film transistor formed thereon, an upper substrate with a color filter formed thereon, and a liquid crystal layer formed between the lower and upper substrates. Also, a column spacer, which is used to maintain a cell gap between the lower and upper substrates, is formed between the lower and upper substrates.

Hereinafter, a related art LCD device will be described with reference to the accompanying drawings.

FIG. 1 is a cross sectional view illustrating a related art LCD device.

As shown in FIG. 1, the related art LCD device may include a lower substrate 10, an upper substrate 20, and a liquid crystal layer 30 between the lower and upper substrates 10 and 20.

Although not shown, on the lower substrate 10, there is a thin film transistor and a pixel electrode. Also, a lower alignment film 15 is formed on the uppermost surface of the lower substrate 10.

Although not shown, on the upper substrate 20, there is a color filter. Also, a column spacer 22 for maintaining a cell gap is formed on the upper substrate 20, and an upper alignment film 25 is formed on the uppermost surface of the upper substrate 20. An initial alignment of the liquid crystal layer 30 is controlled by the lower alignment film 15 and the upper alignment film 25.

However, the related art LCD device may have the following disadvantages.

The column spacer 22 is fixed to the upper substrate 20, however, the column spacer 22 is not fixed to the lower substrate 10. If an external force is applied to the related art LCD device, the column spacer 22 may be moved by the external force. Thus, the lower alignment film 15 formed on the lower substrate 10 may be damaged due to the column spacer 22 moved by the external force. If the lower alignment film 15 is damaged, the alignment of the liquid crystal layer 30 is not controlled so that problems such as brightness defects occur.

SUMMARY OF THE INVENTION

Embodiments of the present invention are directed to a liquid crystal display device that substantially obviates one or more problems due to limitations and disadvantages of the related art.

An aspect of the embodiments of the present invention is to provide a liquid crystal display device which helps to prevent a lower alignment film from being damaged by a column spacer.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a liquid crystal display device that includes first and second substrates; a liquid crystal layer between the first and second substrates; first and second bumps on the first substrate; and at least one first protrusion facing the first bump, and at least one second protrusion facing the second bump, the first and second protrusions being on the second substrate, wherein the at least one first protrusion faces one side of the first bump, and the at least one second protrusion faces the other side of the second bump.

In addition, the liquid crystal display device may further include gate and data lines on the first substrate, the gate line being in a first direction, and the data line being in a second direction, wherein the first bump includes a first bar extending in a length direction of the gate line, the first bar overlapping the gate line, and wherein the second bump includes a second bar extending in the length direction of the gate line, the second bar overlapping the gate line.

The at least one first protrusion is smaller in size than the first bump and has a dot structure overlapped with the first bump, and the at least one second protrusion is smaller in size than the second bump and has a dot structure overlapped with the second bump.

Also, the first bump may further include a first extending portion extending from one side and from the other side of the first bar, and the second bump may further include a second extending portion extending from one side and from the other side of the second bar, wherein the at least one first protrusion is overlapped with the first extending portion extending from the one side of the first bar, and the at least one second protrusion is overlapped with the second extending portion extending from the other side of the second bar.

Furthermore, the liquid crystal display device may further include a light-shielding layer overlapping the gate and data lines, a first extending light-shielding portion overlapping the first extending portion of the first bump, and a second extending light-shielding portion overlapping the second extending portion of the second bump, the light-shielding layer, the first extending light-shield portion and the second extending light-shield portion being on the second substrate.

The first bump may further include a first extending portion extending from one side of the first bar, and a first groove is at the other side of the first bar, the second bump may further include a second extending portion extending from the other side of the second bar, and a second groove is at one side of the second bar, and the at least one first protrusion may be overlapped with the first extending portion extending from the one side of the first bar, and the at least one second protrusion may be overlapped with the second extending portion extending from the other side of the second bar.

Also, the first and second protrusions may include a bar structure extending in a length direction of the data line, the first and second protrusions overlapping the data line, one portion of the at least one first protrusion may be overlapped with the first extending portion, and another portion of the at least one first protrusion may be not overlapped with the first extending portion, and one portion of the at least one second protrusion may be overlapped with the second extending portion, and another portion of the at least one second protrusion may be not overlapped with the second extending portion.

Furthermore, the liquid crystal display device may further include a light-shielding layer overlapping the gate and data lines, a first extending light-shielding portion overlapping the first extending portion of the first bump, and a second extending light-shielding portion overlapping the second extending portion of the second bump, the light-shielding layer, the first extending light-shield portion and the second extending light-shield portion being on the second substrate.

The first and second protrusions may include a bar structure extending in a length direction of the data line, the first and second protrusions overlapping the data line, and one portion of the at least one first protrusion may be overlapped with one side of the first bump, and one portion of the at least one second protrusion may be overlapped with the other side of the second bump.

Also, the first bump and the second bump may be connected with each other by a connection portion.

Also, the first bump and the first protrusion may maintain a cell gap of the liquid crystal layer, and the first bump and the at least one first protrusion may maintain the cell gap of the liquid crystal layer, and the second bump and the at least one second protrusion may maintain the cell gap of the liquid crystal layer.

Also, one side of the first bump and the other side of the second bump may be in combination with one among a combination of the left side with respect to the center of the first bump and the right side with respect to the center of the second bump, a combination of the right side with respect to the center of the first bump and the left side with respect to the center of the second bump, a combination of the upper side with respect to the center of the first bump and the lower side with respect to the center of the second bump, a combination of the lower side with respect to the center of the first bump and the upper side with respect to the center of the second bump, a combination of the lower left side with respect to the center of the first bump and the upper right side with respect to the center of the second bump, a combination of the upper left side with respect to the center of the first bump and the lower right side with respect to the center of the second bump, a combination of the lower right side with respect to the center of the first bump and the upper left side with respect to the center of the second bump, or a combination of the upper right side with respect to the center of the first bump and the lower left side with respect to the center of the second bump.

In another aspect of the present invention, there is provided a liquid crystal display device that may include a liquid crystal layer between first and second substrates; a structure fixed to each of the first and second substrates, the structure being between the first and second substrates; and an alignment film on at least one among the first and second substrates, wherein the structure maintains a cell gap between the first and second substrates and reduces a damage of the alignment film even when the structure is affected by an external force.

The structure may include a first structure and a second structure, the first structure and the second structure being different from each other.

The first structure may include a first bump fixed to the first substrate, and a first protrusion fixed to the second substrate, and the second structure may include a second bump fixed to the first substrate, and a second protrusion fixed to the second substrate.

The first and second structures may be configured such that the second protrusion may be maintained on the second bump if the first protrusion is dislodged from the first bump by the external force.

In another aspect of the present invention, there is provided a liquid crystal display device that may include a liquid crystal layer between first and second substrates; a first structure on the first substrate; a second structure on the second substrate, wherein the second structure faces the first structure; and an alignment film on at least one among the first and second substrates, wherein the first structure is configured to maintain a cell gap between the first and second substrates and reduces a damage of the alignment film if the second structure is affected by an external force.

The first structure may have a bump shape, and the second structure may have a protrusion shape.

Also, a width of the second structure may be smaller than a width of the first structure.

The first structure and the second structure may be configured to maintain the cell gap of the liquid crystal layer.

The first substrate may further include gate and data lines, the gate line being in a first direction, and the data line being in a second direction, and wherein the first structure includes at least one bar extending in a length direction of the gate line, the first structure overlapping the gate line.

The second structure may be smaller in size than the first structure and has a dot structure overlapped with the first structure.

The second structure may further include an extending portion extending from one side and from the other side of at least one bar, and a groove is at the other side of at least one bar.

The second structure may include a bar structure extending in a length direction of the data line, the second structure overlapping the data line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
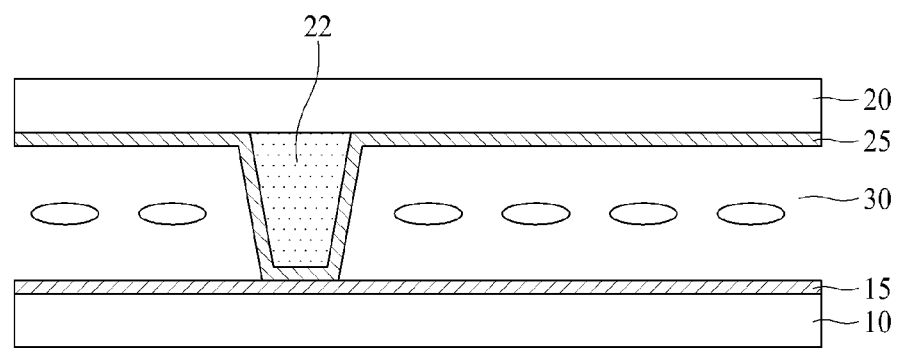
FIG. 1 is a cross sectional view illustrating a related art LCD device.

Reference will now be made in detail to the exemplary embodiments of the present invention, examples of which are illustrated in the accompanying drawings. Wherever possible, the same reference numbers will be used through- out the drawings to refer to the same or like parts.

Advantages and features of the present invention, and implementation methods thereof will be clarified through following embodiments described with reference to the accompanying drawings. The present invention may, how- ever, be embodied in different forms and should not be construed as limited to the embodiments set forth herein. Rather, these embodiments are provided so that this disclo- sure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary. In construing an element, the element is construed as including an error region although there is no explicit description.

In description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover, a case where a third structure is disposed ther- ebetween.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can suffi- ciently understand. The embodiments of the present inven- tion may be carried out independently from each other, or may be carried out together in co-dependent relationship.

Hereinafter, embodiments of the present invention will be described with reference to the accompanying drawings.

Figure 2:
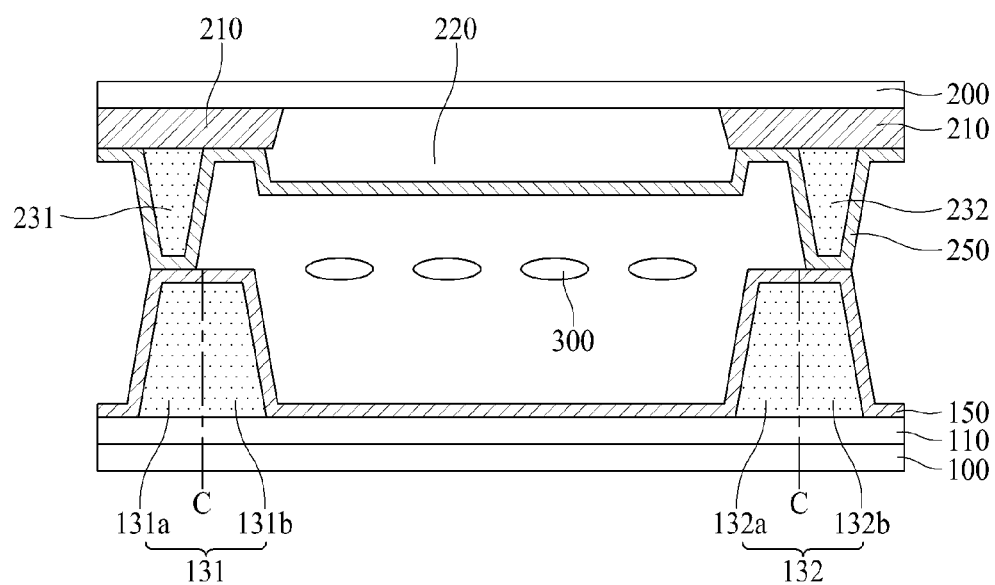
FIG. 2 is a cross sectional view illustrating a liquid crystal display device according to one example embodiment of the present invention.

FIG. 2 is a cross sectional view illustrating a liquid crystal display device according to one example embodiment of the present invention.

As shown in FIG. 2, the liquid crystal display device according to one example embodiment of the present invention may include a first substrate 100, a second substrate 200, and a liquid crystal layer 300 between the first and second substrates 100 and 200.

On the first substrate 100, there is an element layer 110, bumps 131 and 132, and a first alignment film 150.

The element layer 110 is formed on the first substrate 100. The element layer 110 may include gate and data lines crossing each other to define a pixel region, a thin film transistor connected with the gate and data lines, a pixel electrode connected with the thin film transistor, and a common electrode for controlling an alignment direction of the liquid crystal layer 300 by forming an electric field together with the pixel electrode. And the pixel region and another pixel region being adjacent to the pixel region may share one gate line or one date line.

The element layer 110 may vary in structure. For example, the liquid crystal display device according to the present invention may have various modes generally known to those in the art, for example, TN (Twisted Nematic), VA (Vertical Alignment), IPS (In-plane switching) or FFS (Fringe Field Switching) mode. In case of the TN and VA modes, the common electrode is provided on the second substrate 200, whereby a vertical electric field is formed between the pixel electrode and the common electrode. In case of the IPS and FFS modes, the pixel electrode and the common electrode are provided on the first substrate 100, whereby a horizontal electric field is formed between the pixel electrode and the common electrode. In each of the aforementioned modes, each of the pixel and common electrodes may be changed to various shapes generally known to those in the art.

The bumps 131 and 132 are formed on the element layer 110. The bumps 131 and 132 together with protrusions 231 and 232 to be explained later may maintain a cell gap of the liquid crystal display device. That is, a column spacer is formed by combination of the bumps 131 and 132 and the protrusions 231 and 232. This will be described later in detail. As as the column spacer is formed by combination of the bumps 131 and 132 and the protrusions 231 and 232, a height of each of the bumps 131 and 132, and the protrusions 231 and 232 should be determined in consideration of the cell gap of the liquid crystal display device. The height of the bumps 131 and 132 may be the same as the height of the protrusions 231 and 232, or may be different from the height of the protrusions 231 and 232. The height of each of the bumps 131 and 132 may be within a range of 0.5 µm to 2.0 µm, and the height of each of the protrusions 231 and 232 may be within a range of 0.5 µm to 2.0 µm.

The first alignment film 150 is formed on the uppermost surface of the first substrate 100. Accordingly, the first alignment film 150 is formed on an upper surface of the bumps 131 and 132. The first alignment film 150 may be formed by aligning a polymer material such as polyimide in a predetermined direction using roller or ultraviolet rays (UV).

A light-shielding layer 210, a color filter layer 220, the protrusions 231 and 232, and a second alignment film 250 are formed on the second substrate 200.

The light-shielding layer 210 is provided in a matrix configuration on the second substrate 200. The light-shielding layer 210 prevents a light leakage in other regions except the pixel region.

The color filter layer 220 is formed in a region between each pattern of the light-shielding layer 210 provided in the matrix configuration, that is, the pixel region. The color filter layer 220 may include red (R), green (G), and blue (B) color filters formed in the respective pixels.

The protrusions 231 and 232 are formed on the light-shielding layer 210. The protrusions 231 and 232 are disposed to correspond with the bumps 131 and 132. The protrusions 231 and 232 and the bumps 131 and 132 are overlapped with the light-shielding layer 210 so that it is possible to prevent light leakage in the regions of forming the respective protrusions 231 and 232 and the bumps 131 and 132.

The second alignment film 250 is formed on the lowermost surface of the second substrate 200. Accordingly, the second alignment film 250 is formed on a lower surface of the protrusions 231 and 232. The second alignment film 250 may be formed by aligning a polymer material such as polyimide in a predetermined direction using roller or ultraviolet rays (UV). The alignment direction of the second alignment film 250 may be perpendicular to the alignment direction of the first alignment film 150, but not necessarily.

According to one example embodiment of the present invention, the bumps 131 and 132 are formed on the first substrate 100, the protrusions 231 and 232 are formed on the second substrate 200, and the bumps 131 and 132 and the protrusions 231 and 232 face each other with the first and second alignment films 150 and 250 positioned in-between so that it is possible to maintain the cell gap of the liquid crystal display device by combination of the bumps 131 and 132 and the protrusions 231 and 232. The bumps 131 and 132 and the protrusions 231 and 232 may be formed of an organic polymer material such as acryl-based polymer, but is not limited to this material. Also, the bumps 131 and 132 may be formed of the same material as that of a planarization film or passivation film for protecting the thin film transistor (T). For example, the bumps 131 and 132 may be formed of an organic material such as acryl-based polymer, but not limited to this material.

If an external force is applied to the liquid crystal display device according to one example embodiment of the present invention, the protrusions 231 and 232 on the second substrate 200 may be affected by the external force. However, since a height of each of the protrusions 231 and 232 is lower than the cell gap, there is a low possibility that the first alignment film 150 on the first substrate 100 is damaged by the protrusions 231 and 232. For example, a height of each of the protrusions 231 and 232 may be within a range of 0.5 µm to 2.0 µm.

According to one example embodiment of the present invention, the bumps 131 and 132 and the protrusions 231 and 232 may be overlapped with the gate and data lines. Thus, there is no need to change a size of the light-shielding layer in accordance with the shape of bumps 131 and 132 or the shape of protrusions 231 and 232, whereby it is advantageous to processing margin securement and design. Also, there is no need to change a size of the light-shielding layer in consideration of the moving or shifting region of the protrusions by the external force, to thereby secure processing margin and design freedom of the liquid crystal display device.

If an overlapping area between the bumps 131 and 132 and the protrusions 231 and 232 facing each other with the first and second alignment films 150 and 250 interposed therebetween is increased in size, a frictional force between the first and second alignment films 150 and 250 is increased when the protrusions 231 and 232 are moved or shifted by the external force. In this case, after the external force disappears, it takes a long time to restore the protrusions 231 and 232 to their original positions, whereby it takes a long time to restore the liquid crystal layer 300 around the protrusions 231 and 232. Thus, in order to facilitate the restoration of the protrusions 231 and 232 and the liquid crystal layer 300 around the protrusions 231 and 232 after disappearance of the external force, decreasing the overlapping area between the bumps 131 and 132 and the protrusions 231 and 232 is advantageous. However, if the overlapping area between the bumps 131 and 132 and the protrusions 231 and 232 is decreased in size, the protrusions 231 and 232 may be dislodged from the bumps 131 and 132 by the external force applied thereto, and the first alignment film 150 may be damaged by the protrusion 231 and 232.

Accordingly, there has been a need to decrease the overlapping area between the bumps 131 and 132 and the protrusions 231 and 232 and to overcome the above problem caused by a case that the protrusions 231 and 232 are dislodged from the bumps 131 and 132. Hereinafter, a structure of the bumps 131 and 132 and the protrusions 231 and 232 according to one example embodiment of the present invention, which enables to satisfy the above need, will be described in detail as follows.

The bumps 131 and 132 include the first and second bumps 131 and 132, and the protrusions 231 and 232 include the first and second protrusions 231 and 232.

The first bump 131 and the first protrusion 231 facing each other are provided to correspond with each other, and the second bump 132 and the second protrusion 232 facing each other are provided to correspond with each other.

In this case, a width of the first protrusion 231 is smaller than a width of the first bump 131, whereby the overlapping area between the first bump 131 and the first protrusion 231 is decreased in size. Also, a width of the second protrusion 232 is smaller than a width of the second bump 132, whereby the overlapping area between the second bump 132 and the second protrusion 232 is decreased in size.

Also, a facing position between the first bump 131 and the first protrusion 231 is different from a facing position between the second bump 132 and the second protrusion 232. Thus, it is possible to reduce the problem caused by a case that the protrusions 231 and 232 are dislodged from the bumps 131 and 132 when the external force is applied to the liquid crystal display device.

In detail, the first bump 131 may include one side 131a and the other side 131b with respect to the center (c), and the second bump 132 may include one side 132a and the other side 132b with respect to the center (c). In this specification of the present invention, one side 131a of the first bump 131 and one side 132a of the second bump 132 are disposed at the same side with respect to the center (c) of each bump, the other side 131b of the first bump 131 and the other side 132b of the second bump 132 are disposed at the same side with respect to the center (c) of each bump, and each of one side of the first and second bumps 131 and 132 is opposite to each of the other side of the first and second bumps 131 and 132.

According to one example embodiment of the present invention, the first protrusion 231 is disposed to face one side 131a of the first bump 131, and the second protrusion 232 is disposed to face the other side 132b of the second bump 132. That is, the first protrusion 231 and the second protrusion 232 are disposed at the different sides with respect to each of the first bump 131 and the second bump 132. Thus, if any one among the protrusions 231 and 232 is dislodged from any one among the bumps 131 and 132, the other among the protrusions 231 and 232 may be maintained on the other among the bumps 131 and 132. As a result, there is a low possibility that the first alignment film 150 is damaged by the protrusion 231 and 232 dislodged from the bump 131 and 132.

Figure 3A:
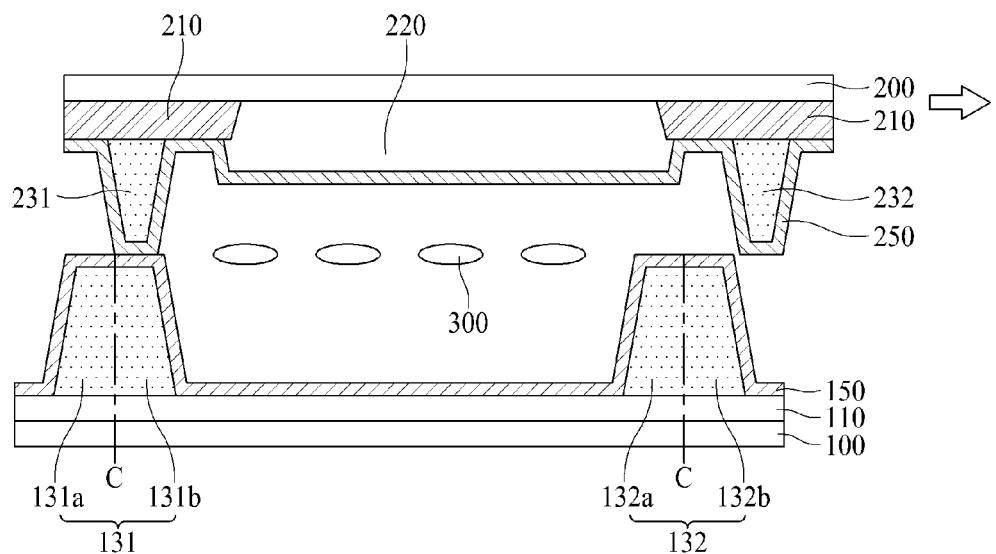
FIGS. 3A and 3B are cross sectional views showing that protrusion provided on the second substrate is affected by an external force in case of the liquid crystal display device according to one example embodiment of the present invention.
Figure 3B:
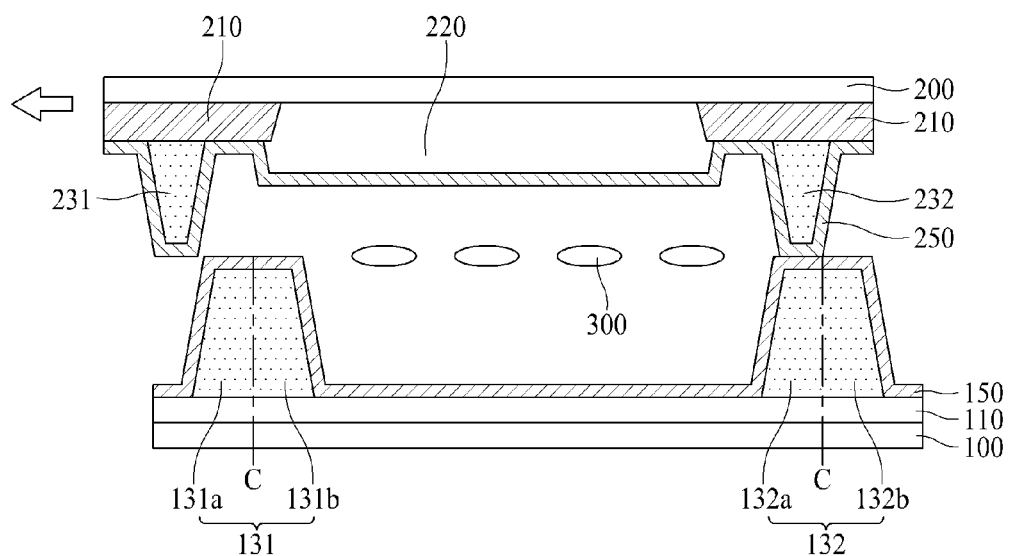

FIGS. 3A and 3B are cross sectional views showing the protrusions 231 and 232 provided on the second substrate 200, which move by the external force, in the liquid crystal display device according to one example embodiment of the present invention.

As shown in FIG. 3A, if the external force is applied in the direction from the left side to the right side, the first protrusion 231 and the second protrusion 232 moves toward the right direction. In this case, while the second protrusion 232 disposed at the other side 132b of the second bump 132 is dislodged from the second bump 132, the first protrusion 231 disposed at one side 131a of the first bump 131 is maintained on the first bump 131 without being dislodged from the first bump 131. Accordingly, it is possible to maintain the cell gap of the liquid crystal display device by the combination of the first bump 131 and the first protrusion 231, that is, it is possible to prevent the first alignment film 150 from being damaged by the second protrusion 232 dislodged from the second bump 132.

As shown in FIG. 3B, if the external force is applied in the direction from the right side to the left side, the first protrusion 231 and the second protrusion 232 moves toward the left direction. In this case, while the first protrusion 231 disposed at one side 131a of the first bump 131 is dislodged from the first bump 131, the second protrusion 232 disposed at the other side 132b of the second bump 132 is maintained on the second bump 132 without being dislodged from the second bump 132. Accordingly, it is possible to maintain the cell gap of the liquid crystal display device by the combination of the second bump 132 and the second protrusion 232, that is, it is possible to prevent the first alignment film 150 from being damaged by the first protrusion 231 dislodged from the first bump 131.

Figure 4:
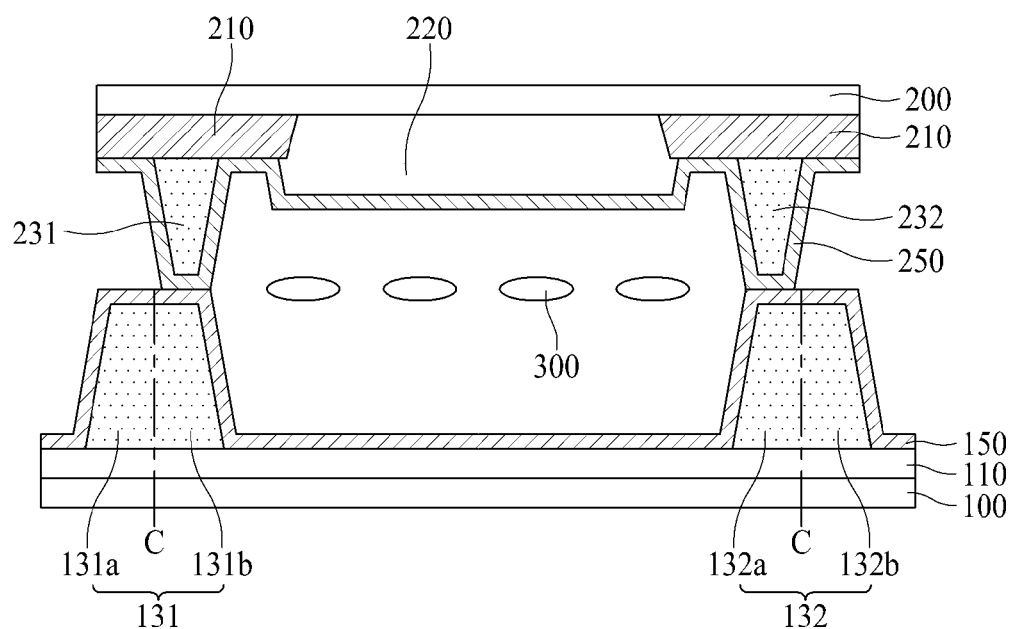
FIG. 4 is a cross sectional view illustrating a liquid crystal display device according to another example embodiment of the present invention.

FIG. 4 is a cross sectional view illustrating a liquid crystal display device according to another example embodiment of the present invention. Except a change in position of the first protrusion 231 and second protrusion 232, the liquid crystal display device of FIG. 4 is identical in structure to the liquid crystal display device of FIG. 2, whereby the same reference numbers will be used throughout the drawings to refer to the same or like parts, and only different parts will be described in detail.

As shown in FIG. 4, according to another example embodiment of the present invention, the first protrusion 231 is disposed at the other side 131b of the first bump 131, and the second protrusion 232 is disposed at one side 132a of the second bump 132. Accordingly, even though any one among the protrusions 231 and 232 is dislodged from any one among the bumps 131 and 132, the other among the protrusions 231 and 232 may be maintained on the other among the bumps 131 and 132, to thereby prevent the first alignment film 150 from being damaged by the protrusions 231 and 232.

Figure 5A:
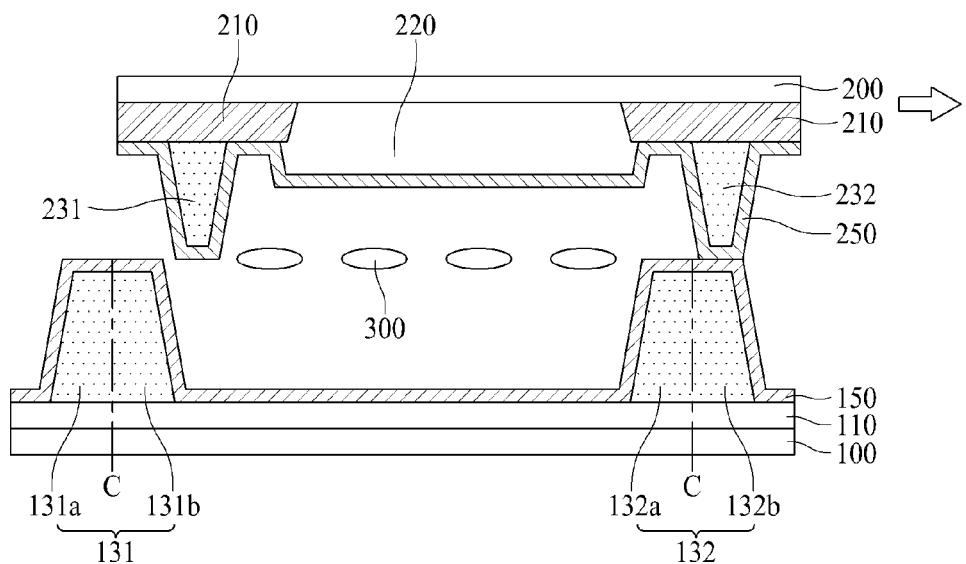
FIGS. 5A and 5B are cross sectional views showing that protrusion provided on the second substrate is affected by an external force in case of the liquid crystal display device according to another example embodiment of the present invention.
Figure 5B:
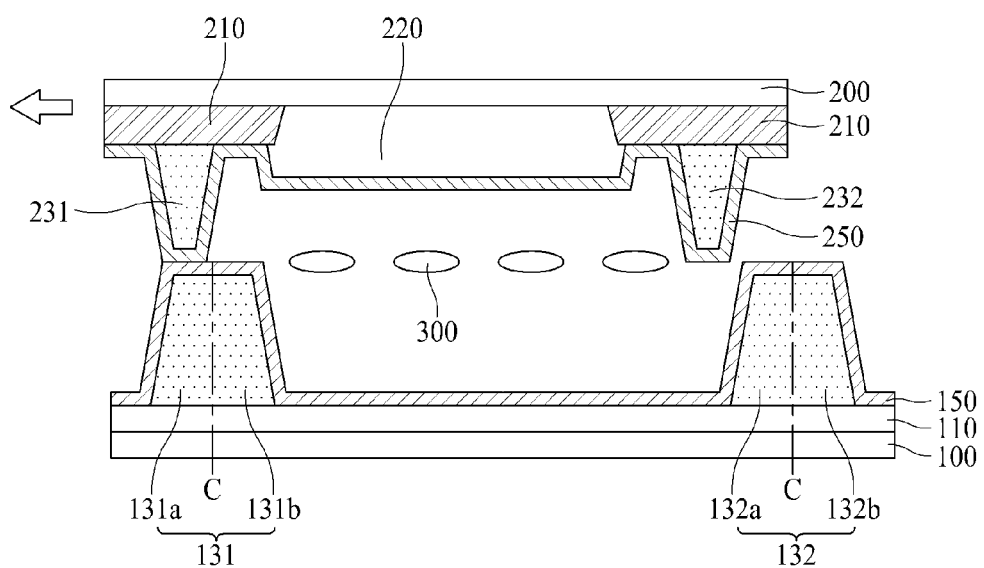

FIGS. 5A and 5B are cross sectional views showing the protrusions 231 and 232 on the second substrate 200, which move by the external force, in the liquid crystal display device according to another example embodiment of the present invention.

As shown in FIG. 5A, if the external force is applied in the direction from the left side to the right side, the first protrusion 231 disposed at the other side 131b of the first bump 131 is dislodged from the first bump 131, however, the second bump 232 disposed at one side 132a of the second bump 132 is not dislodged from the second bump 132, to thereby prevent the first alignment film 150 from being damaged by the first protrusion 231 dislodged from the first bump 131.

As shown in FIG. 5B, if the external force is applied in the direction from the right side to the left side, the second protrusion 232 disposed at one side 132a of the second bump 132 is dislodged from the second bump 132, however, the first protrusion 231 disposed at the other side 131b of the first bump 131 is not dislodged from the first bump 131, to thereby prevent the first alignment film 150 from being damaged by the second protrusion 232 dislodged from the second bump 132.

Figure 6A:
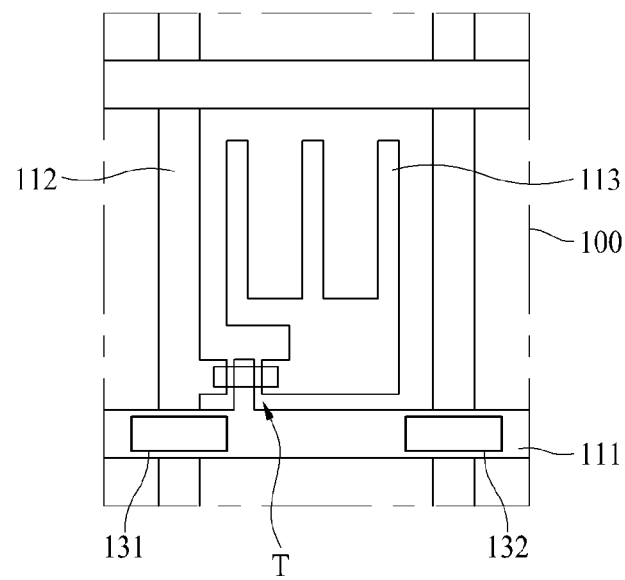
FIG. 6A is a plane view illustrating a first substrate of the liquid crystal display device according to one example embodiment of the present invention.
Figure 6B:
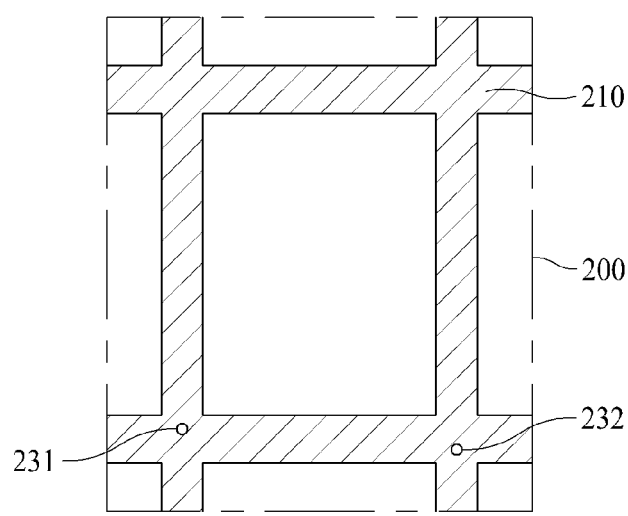
FIG. 6B is a plane view illustrating a second substrate of the liquid crystal display device according to one example embodiment of the present invention.
Figure 6C:
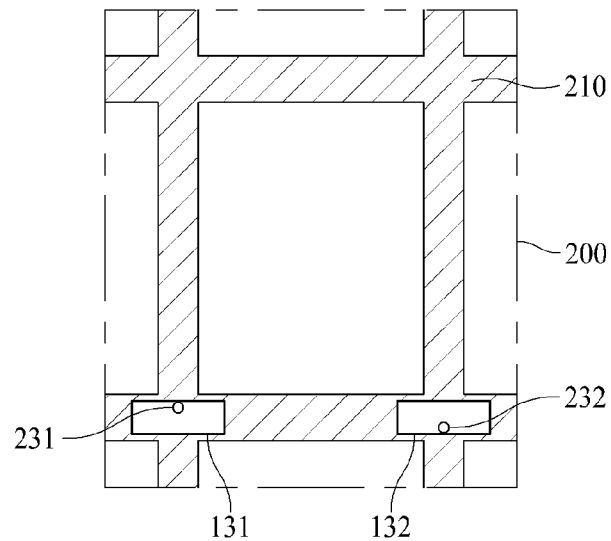
FIG. 6C is a plane view illustrating a figure of overlap between a protrusion and a bump in the liquid crystal display device according to one embodiment of the present invention.

FIG. 6A is a plane view illustrating the first substrate 100 of the liquid crystal display device according to one example embodiment of the present invention, FIG. 6B is a plane view illustrating the second substrate 200 of the liquid crystal display device according to one example embodiment of the present invention, and FIG. 6C is a plane view illustrating a figure of overlap between the protrusions 231 and 232 and the bumps 131 and 132 in the liquid crystal display device according to one example embodiment of the present invention.

As shown in FIG. 6A, the gate line 111 is disposed in a first direction on the first substrate 100, and the data line 112 is disposed in a second direction on the first substrate 100, to thereby define the pixel region by the gate and data lines 111 and 112 crossing each other, but is not limited thereto. For example, the pixel region and another pixel region being adjacent to the pixel region may share one gate line or one date line. Also, the thin film transistor (T) is formed at the crossing region of the gate and data lines 111 and 112, and the pixel electrode 113 being connected with the thin film transistor (T) is formed in the pixel region. A common electrode may be additionally formed on the first substrate 100, wherein the common electrode together with the pixel electrode 113 may form the electric field.

Also, the first bump 131 and the second bump 132 are formed on the first substrate 100. The first bump 131 and the second bump 132 overlap with the gate line 111. In more detail, each of the first bump 131 and the second bump 132 may include a bar structure extending in a length direction of the gate line 111.

As shown in FIG. 6B, the light-shielding layer 210 of the matrix configuration is formed on the second substrate 200. The light-shielding layer 210 of the matrix configuration on the second substrate 200 is provided to correspond with the gate and data lines 111 and 112 formed on the first substrate 100.

Also, the first protrusion 231 and the second protrusion 232 are formed on the second substrate 200. The first protrusion 231 and the second protrusion 232 are overlapped with the light-shielding layer 210. In more detail, the first protrusion 231 and the second protrusion 232 may include a dot structure overlapped with the light-shielding layer 210. Especially, the first protrusion 231 is positioned at an upper side as compared with the second protrusion 232, and the second protrusion 232 is positioned at a lower side as compared with the first protrusion 231.

The first protrusion 231 may correspond to the first bump 131, and the second protrusion 232 may correspond to the second bump 132. FIG. 6B shows one among the first protrusion 231 and one among the second protrusion 232, but not necessarily. Two or more first protrusions 231 may correspond to the first bump 131, and two or more second protrusions 232 may correspond to the second bump 132. Also, it is possible to reverse the shape of the first and second protrusions 231 and 232, and the shape of the first and second bumps 131 and 132. These may be applied to all the following example embodiments of the present invention in common.

As shown in FIG. 6C, the first bump 131, the second bump 132, the first protrusion 231, and the second protrusion 232 may be overlapped with the light-shielding layer 210, to thereby prevent a light leakage in the respective regions.

The first protrusion 231 is overlapped with the first bump 131, and the second protrusion 232 is overlapped with the second bump 132. Especially, a size of the first protrusion 231 is smaller than a size of the first bump 131, and the entire first protrusion 231 is overlapped with the first bump 131. Also, a size of the second protrusion 232 is smaller than a size of the second bump 132, and the entire second protrusion 232 is overlapped with the second bump 132.

In this case, the first protrusion 231 may correspond to one side of the first bump 131, for example, the upper side of the first bump 131, and the second protrusion 232 may correspond to the other side of the second bump 132, for example, the lower side of the second bump 132. Thus, as described above, even though any one among the protrusions 231 and 232 is dislodged from any one among the bumps 131 and 132, the other among the protrusions 231 and 232 is maintained on the other among the bumps 131 and 132 without being dislodged from the bumps 131 and 132.

In FIG. 6C, the first protrusion 231 is positioned at the upper side with respect to the center of the first bump 131, and the second protrusion 232 is positioned at the lower side with respect to the center of the second bump 232, but is not necessarily. The first protrusion 231 may be positioned at the lower side with respect to the center of the first bump 131, and the second protrusion 232 may be positioned at the upper side with respect to the center of the second bump 132.

Also, the first protrusion 231 may be positioned at the left side with respect to the center of the first bump 131, and the second protrusion 232 may be positioned at the right side with respect to the center of the second bump 132. The first protrusion 231 may be positioned at the right side with respect to the center of the first bump 131, and the second protrusion 232 may be positioned at the left side with respect to the center of the second bump 132.

Also, the first protrusion 231 and the second protrusion 232 may be positioned diagonal to the second protrusion 232. That is, the first protrusion 231 may be positioned at the lower left side with respect to the center of the first bump 131 and the second protrusion 232 may be positioned at the upper right side with respect to the center of the second bump 132; the first protrusion 231 may be positioned at the upper left side with respect to the center of the first bump 131 and the second protrusion 232 may be positioned at the lower right side with respect to the center of the second bump 132; the first protrusion 231 may be positioned at the lower right side with respect to the center of the first bump 131 and the second protrusion 232 may be positioned at the upper left side with respect to the center of the second bump 132; or the first protrusion 231 may be positioned at the upper right side with respect to the center of the first bump 131 and the second protrusion 232 may be positioned at the lower left side with respect to the center of the second bump 132

The various positions of the first and second protrusions 231 and 232 may be applied to the various embodiments of the present invention to be explained as follows.

Figure 7:
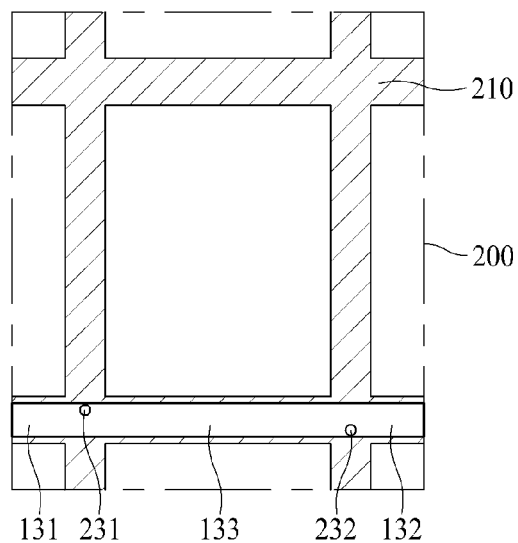
FIG. 7 is a plane view illustrating a liquid crystal display device according to another example embodiment of the present invention.

FIG. 7 is a plane view illustrating the liquid crystal display device according to another example embodiment of the present invention, which shows that the protrusions 231 and 232 and the bumps 131 and 132 are overlapped as shown in FIG. 6C.

Except that the first bump 131 and the second bump 132 are connected with each other by a connection portion 133, the liquid crystal display device shown in FIG. 7 is identical in structure to the liquid crystal display device shown in FIGS. 6A to 6C.

As shown in FIG. 7, according to another example embodiment of the present invention, the first bump 131, the connection portion 133 and the second bump 132 may be connected as one body, and the one body structure of the first bump 131, the connection portion 133 and the second bump 132 may extend along the gate line 111. Hereinafter, only different structures, which are different from those of FIGS. 6A to 6C, will be described in detail as follows.

Figure 8A:
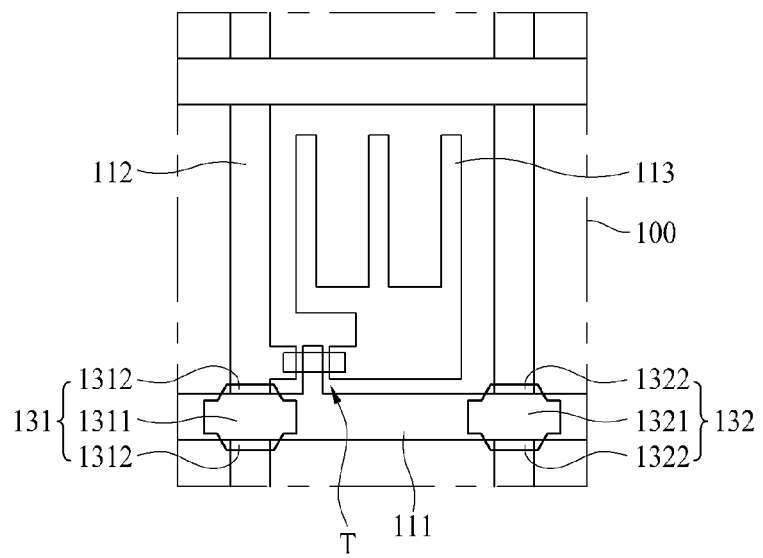
FIG. 8A is a plane view illustrating a first substrate of the liquid crystal display device according to another example embodiment of the present invention.
Figure 8B:
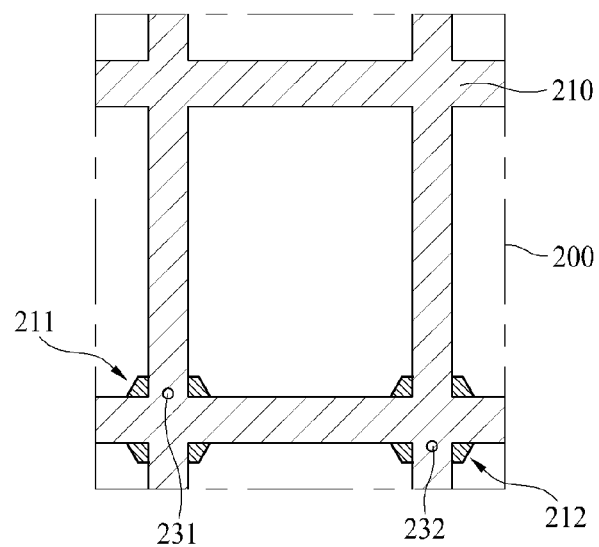
FIG. 8B is a plane view illustrating a second substrate of the liquid crystal display device according to another example embodiment of the present invention.
Figure 8C:
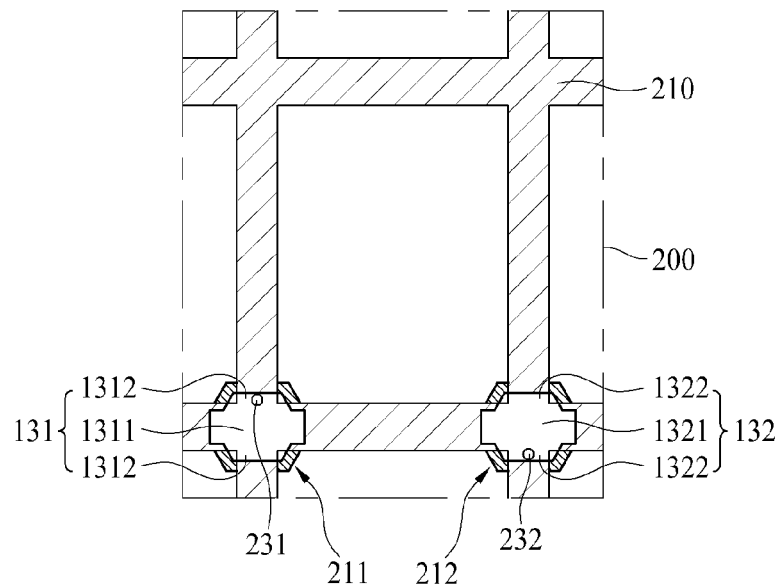
FIG. 8C is a plane view illustrating a figure of overlap between a protrusion and a bump in the liquid crystal display device according to another example embodiment of the present invention.

FIG. 8A is a plane view illustrating a first substrate 100 of a liquid crystal display device according to another example embodiment of the present invention, FIG. 8B is a plane view illustrating a second substrate 200 of the liquid crystal display device according to another example embodiment of the present invention, and FIG. 8C is a plane view illustrating a figure of overlap between protrusions 231 and 232 and bumps 131 and 132 in the liquid crystal display device according to another example embodiment of the present invention.

As shown in FIG. 8A, a first bump 131 and a second bump 132 are formed on a first substrate 100.

The first bump 131 may include a first bar 1311 extending in a length direction of the gate line 111, and a first extending portion 1312 extending from one side and the other side of the first bar 1311. The first bar 1311 is overlapped with the gate line 111, and the first extending portion 1312 may extend out of the gate line 111.

The second bump 132 may include a second bar 1321 extending in a length direction of the gate line 111, and a second extending portion 1322 extending from one side and the other side of the second bar 1321. The second bar 1321 is overlapped with the gate line 111, and the second extending portion 1322 may extend out of the gate line 111.

As shown in FIG. 8B, a light-shielding layer 210 having a matrix configuration is formed on a second substrate 200. A first extending light-shielding portion 211 and a second extending light-shielding portion 212 are connected with the light-shielding layer 210. The first extending light-shielding portion 211 is provided in correspondence with the first extending portion 1312 of the first bump 131, to thereby prevent a light leakage in the first extending portion 1312 of the first bump 131. The second extending light-shielding portion 212 is provided in correspondence with the second extending portion 1322 of the second bump 132, to thereby prevent a light leakage in the second extending portion 1322 of the second bump 132.

As shown in FIG. 8C, the first bump 131, the second bump 132, the first protrusion 231 and the second protrusion 232 are overlapped with the light-shielding layer 210, the first extending light-shielding portion 211 and the second extending light-shielding portion 212, to thereby prevent a light leakage in the respective regions.

The first protrusion 231 is overlapped with one side of the first bump 131, and more particularly, the first extending portion 1312 extending from one side of the first bar 1311. The second protrusion 232 is overlapped with the other side of the second bump 132, and more particularly, the second extending portion 1322 extending from the other side of the second bar 1321.

In case of the example embodiment shown in FIGS. 8A to 8C, the first bump 131 includes the first extending portion 1312, and the second bump 132 includes the second extending portion 1322, whereby the area of each of the first bump 131 and the second bump 132 is relatively increased as compared with the example embodiment shown in FIG. 6. Accordingly, when the first protrusion 231 and the second protrusion 232 are moved by the external force, there is a high possibility that the first protrusion 231 and the second protrusion 232 are maintained on the first bump 131 and the second bump 132 without being dislodged from the first bump 131 and the second bump 132.

Figure 9:
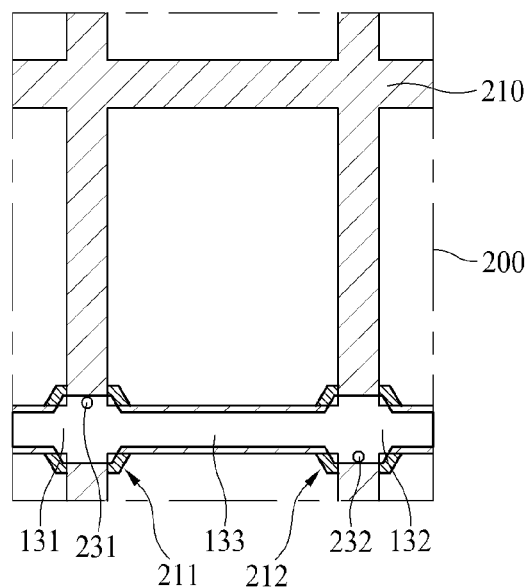
FIG. 9 is a plane view illustrating a liquid crystal display device according to another example embodiment of the present invention.

FIG. 9 is a plane view illustrating the liquid crystal display device according to another example embodiment of the present invention, which shows that that the protrusions 231 and 232 and the bumps 131 and 132 are overlapped as shown in FIG. 8C.

Except that the first bump 131 and the second bump 132 are connected with each other by a connection portion 133, the liquid crystal display device shown in FIG. 9 is identical in structure to the liquid crystal display device shown in FIGS. 8A to 8C. In case of FIG. 9, the first bump 131, the connection portion 133 and the second bump 132 are formed as one body, the one body structure of the first bump 131, the connection portion 133 and the second bump 132 may extend along the gate line 111.

Figure 10A:
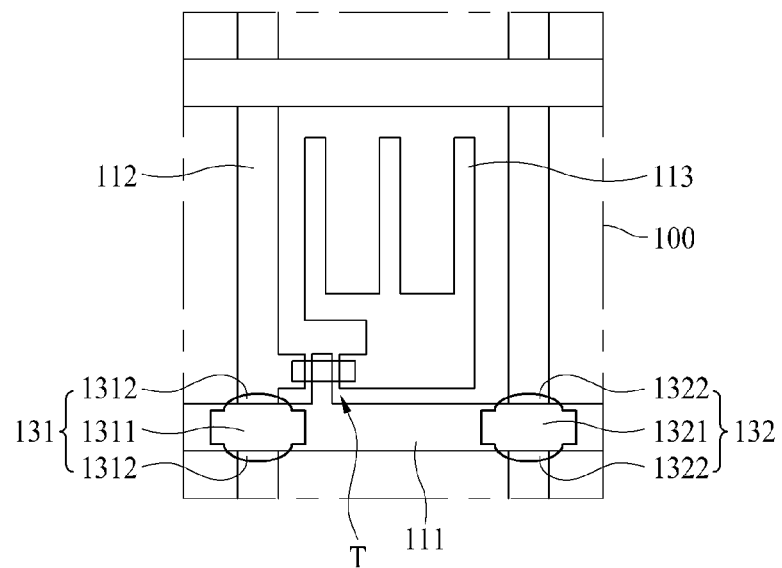
FIG. 10A is a plane view illustrating a first substrate of the liquid crystal display device according to another example embodiment of the present invention.
Figure 10B:
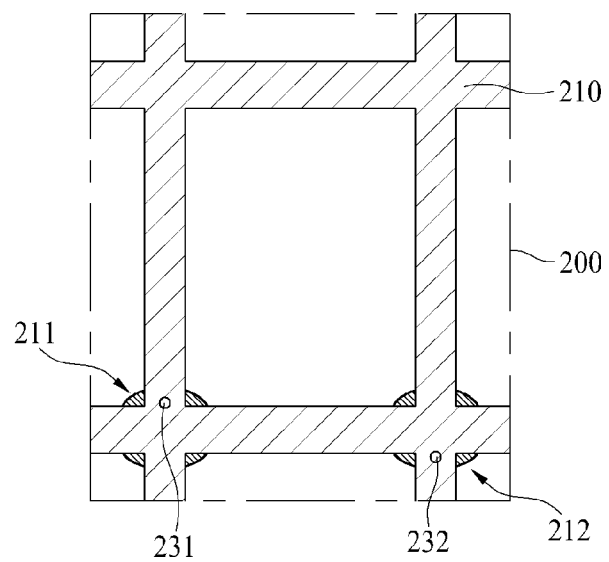
FIG. 10B is a plane view illustrating a second substrate of the liquid crystal display device according to another example embodiment of the present invention.
Figure 10C:
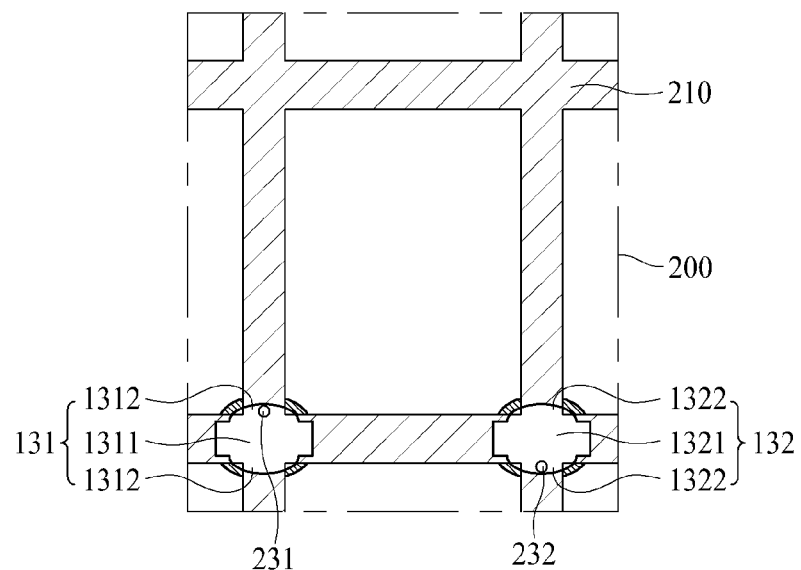
FIG. 10C is a plane view illustrating a figure of overlap between a protrusion and a bump in the liquid crystal display device according to another example embodiment of the present invention.

FIG. 10A is a plane view illustrating a first substrate 100 of a liquid crystal display device according to another example embodiment of the present invention, FIG. 10B is a plane view illustrating a second substrate 200 of the liquid crystal display device according to another example embodiment of the present invention, and FIG. 10C is a plane view illustrating a figure of overlap between protrusions 231 and 232 and bumps 131 and 132 in the liquid crystal display device according to another example embodiment of the present invention.

Except that the first extending portion 1312 of the first bump 131, the second extending portion 1322 of the second bump 132, the first extending light-shielding portion 211 and the second extending light-shielding portion 212 are changed in shape, the liquid crystal display device shown in FIGS. 10A to 10C is identical in structure to the liquid crystal display device shown in FIGS. 8A to 8C.

In case of the liquid crystal display device shown in FIGS. 8A to 8C, the first extending portion 1312 and the second extending portion 1322 are formed in a polygonal shape, whereby the first extending light-shielding portion 211 and the second extending light-shielding portion 212 are formed in a polygonal shape in accordance with the first extending portion 1312 and the second extending portion 1322.

Meanwhile, in case of the liquid crystal display device shown in FIGS. 10A to 10C, the first extending portion 1312 and the second extending portion 1322 are formed in a curved-line shape such as semi-circle or semi-elliptical shape, whereby the first extending light-shielding portion 211 and the second extending light-shielding portion 212 are formed in a curved-line shape such as semi-circle or semi-elliptical shape.

Figure 11:
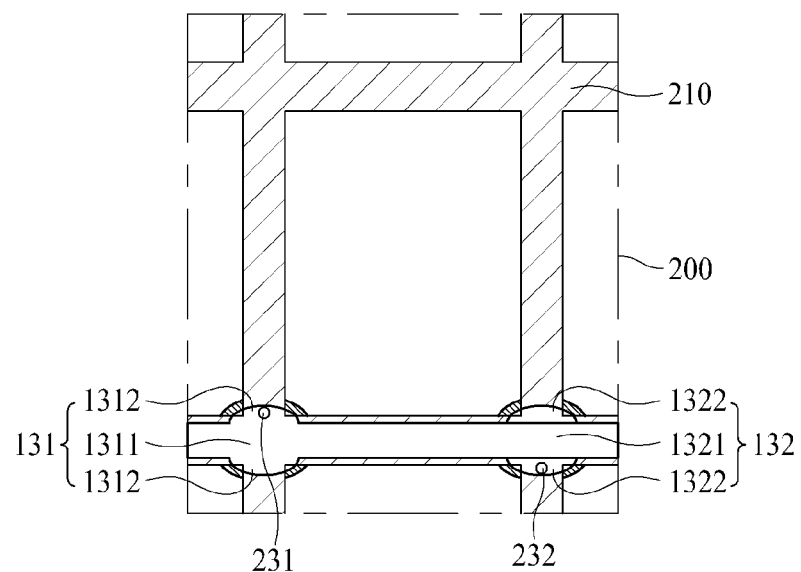
FIG. 11 is a plane view illustrating a liquid crystal display device according to another example embodiment of the present invention.

FIG. 11 is a plane view illustrating a liquid crystal display device according to another example embodiment of the present invention. Except that first and second bumps 131 and 132 are connected with each other by a connection portion 133, the liquid crystal display device shown in FIG. 11 is identical in structure to the liquid crystal display device shown in FIGS. 10A to 10C. Thus, in case of FIG. 11, the first bump 131, the connection portion 133 and the second bump 132 may be connected as one body, and the one body structure of the first bump 131, the connection portion 133 and the second bump 132 may extend along the gate line 111.

Figure 12A:
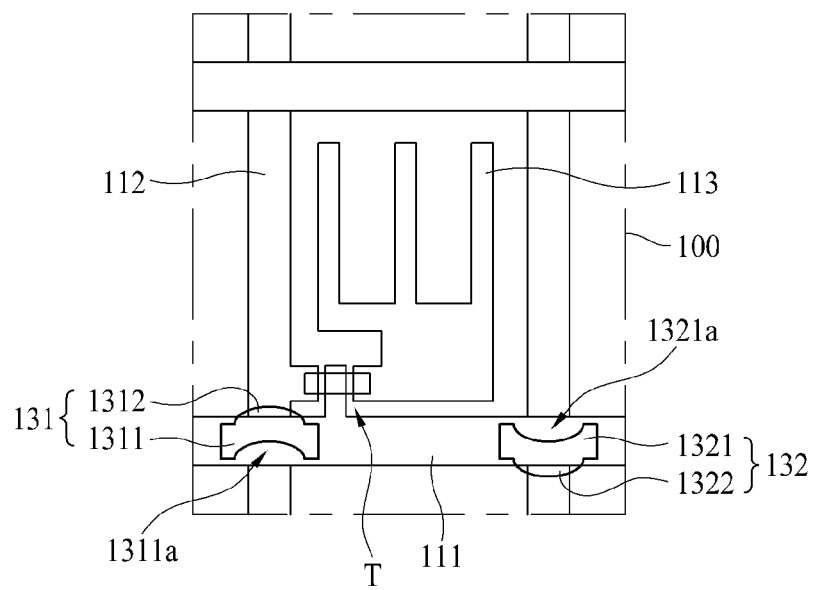
FIG. 12A is a plane view illustrating a first substrate of the liquid crystal display device according to another example embodiment of the present invention.
Figure 12B:
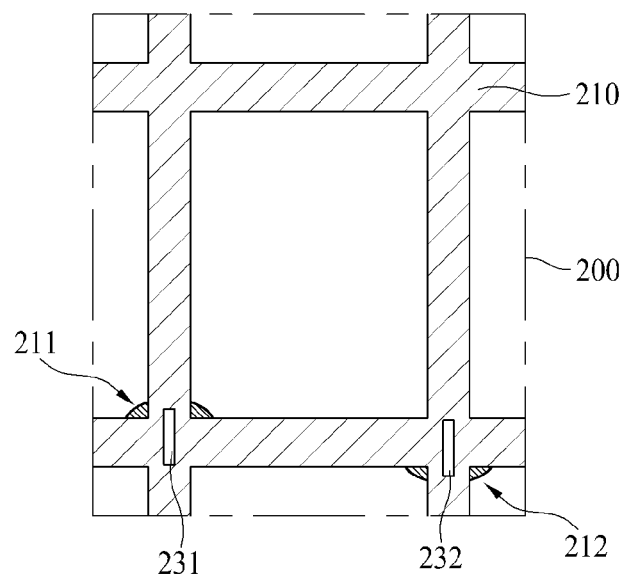
FIG. 12B is a plane view illustrating a second substrate of the liquid crystal display device according to another example embodiment of the present invention.
Figure 12C:
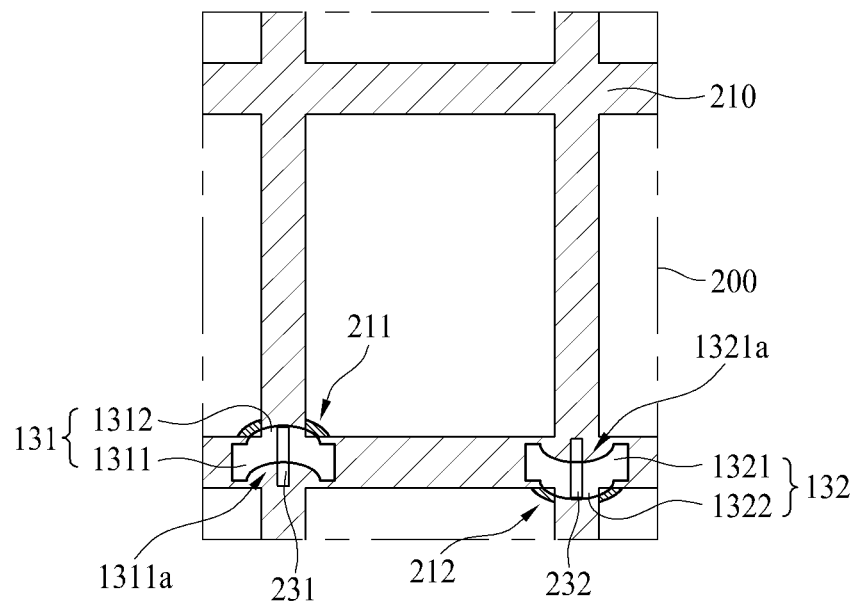
FIG. 12C is a plane view illustrating a figure of overlap between a protrusion and a bump in the liquid crystal display device according to another example embodiment of the present invention.

FIG. 12A is a plane view illustrating a first substrate 100 of a liquid crystal display device according to another example embodiment of the present invention, FIG. 12B is a plane view illustrating a second substrate 200 of the liquid crystal display device according to another example embodiment of the present invention, and FIG. 12C is a plane view illustrating a figure of overlap between protrusions 231 and 232 and bumps 131 and 132 in the liquid crystal display device according to another example embodiment of the present invention. Hereinafter, only different structures, which are different from those of the aforementioned embodiments, will be described in detail as follows.

As shown in FIG. 12A, a first bump 131 and a second bump 132 are formed on a first substrate 100.

The first bump 131 may include a first bar 1311 extending in a length direction of the gate line 111, and a first extending portion 1312 extending from one side of the first bar 1311. The first extending portion 1312 is formed in a curved-line shape such as semi-circle or semi-elliptical shape. A first groove 1311a is formed at the other side of the first bar 1311, wherein the first groove 1311a has a shape corresponding to the shape of the first extending portion 1312. However, the shape of the first groove 1311a may be different from the shape of the first extending portion 1312.

The second bump 132 may include a second bar 1321 extending in the length direction of the gate line 111, and a second extending portion 1322 extending from the other side of the second bar 1321. The second extending portion 1322 is formed in a curved-line shape such as semi-circle or semi-elliptical shape. A second groove 1321a is formed at one side of the second bar 1321, wherein the second groove 1321a has a shape corresponding to the shape of the second extending portion 1322. However, the shape of the second groove 1321a may be different from the shape of the second extending portion 1322.

As shown in FIG. 12B, a light-shielding layer 210 of a matrix configuration is formed on a second substrate 200. A first extending light-shielding portion 211 and a second extending light-shielding portion 212 are connected with the light-shielding layer 210. The first extending light-shielding portion 211 is provided in correspondence with the first extending portion 1312 of the first bump 131, and the second extending light-shielding portion 212 is provided in correspondence with the second extending portion 1322 of the second bump 132.

A first protrusion 231 and a second protrusion 232 are formed on the second substrate 200, wherein each of the first protrusion 231 and the second protrusion 232 is formed in a bar shape overlapped with the light-shielding layer 210. The bar-shaped first protrusion 231 and second protrusion 232 extends in a length direction of the data line 112 while overlapping the data line 112 of the first substrate 110.

As shown in FIG. 12C, the first bump 131, the second bump 132, the first protrusion 231 and the second protrusion 232 are overlapped with the light-shielding layer 210, the first extending light-shielding portion 211 and the second extending light-shielding portion 212.

One portion of the first protrusion 231 is overlapped with one side of the first bump 131, and more particularly, the first extending portion 1312 extending from one side of the first bar 1311, and another portion of the first protrusion 231 is not overlapped with the first bump 131. In more detail, another portion of the first protrusion 231 extends via the first groove 1311a provided in the first bar 1311 of the first bump 131.

One portion of the second protrusion 232 is overlapped with the other side of the second bump 132, and more particularly, the second extending portion 1322 extending from the other side of the second bar 1321, and another portion of the second protrusion 232 is not overlapped with the second bump 132. In more detail, another portion of the second protrusion 232 extends via the second groove 1321a provided in the second bar 1321 of the second bump 132.

Figure 13A:
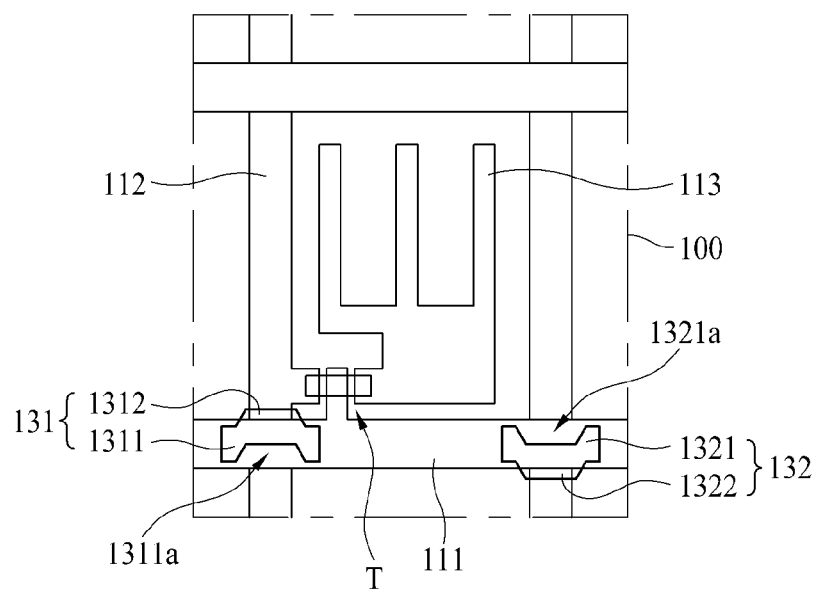
FIG. 13A is a plane view illustrating a first substrate of the liquid crystal display device according to another example embodiment of the present invention.
Figure 13B:
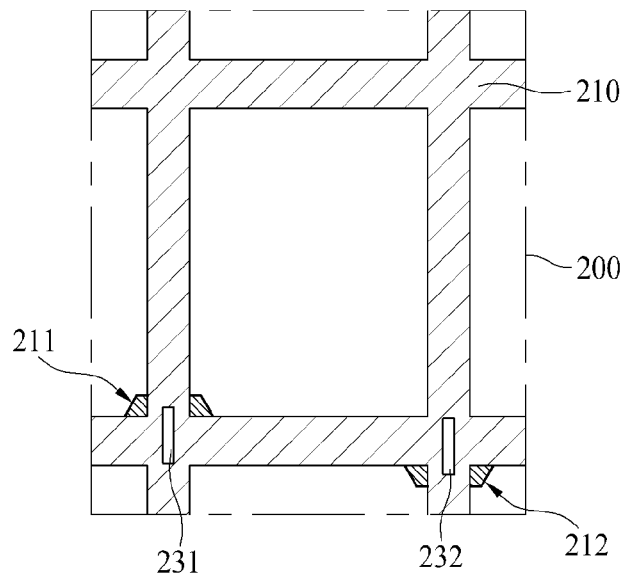
FIG. 13B is a plane view illustrating a second substrate of the liquid crystal display device according to another example embodiment of the present invention.
Figure 13C:
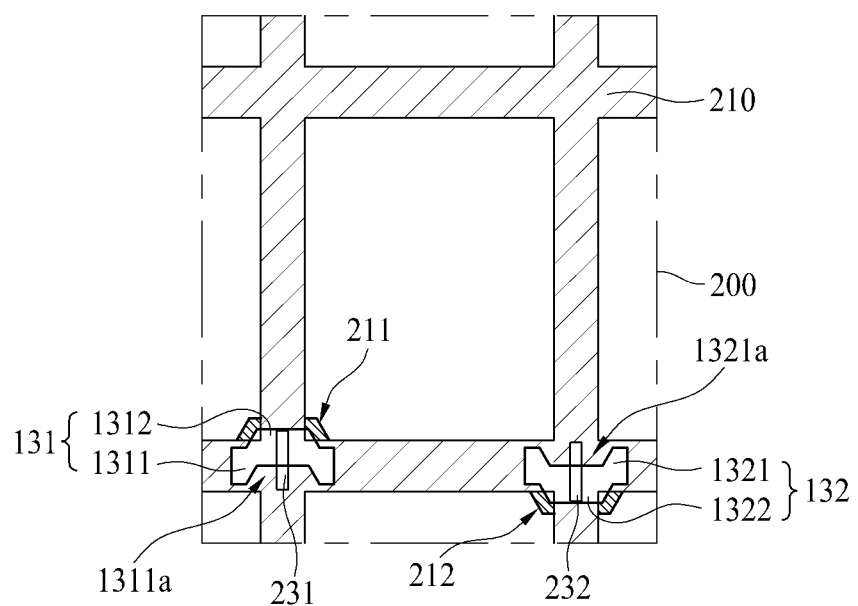
FIG. 13C is a plane view illus- trating a figure of overlap between a protrusion and a bump in the liquid crystal display device according to another example embodiment of the present invention.

FIG. 13A is a plane view illustrating a first substrate 100 of a liquid crystal display device according to another embodiment of the present invention, FIG. 13B is a plane view illustrating a second substrate 200 of the liquid crystal display device according to another example embodiment of the present invention, and FIG. 13C is a plane view illustrating a figure of overlap figure between protrusions 231 and 232 and bumps 131 and 132 in the liquid crystal display device according to another example embodiment of the present invention.

Except that the first extending portion 1312 of the first bump 131, the second extending portion 1322 of the second bump 132, the first extending light-shielding portion 211 and the second extending light-shielding portion 212 are changed in shape, the liquid crystal display device shown in FIGS. 13A to 13C is identical in structure to the liquid crystal display device shown in FIGS. 12A to 12C.

In case of the liquid crystal display device shown in FIGS. 12A to 12C, the first extending portion 1312 and the second extending portion 1322 are formed in a curved-line shape such as semi-circle or semi-elliptical shape, and the first extending light-shielding portion 211 and the second extending light-shielding portion 212 are formed in a curved-line shape.

Meanwhile, in case of the liquid crystal display device shown in FIGS. 13A to 13C, the first extending portion 1312 and the second extending portion 1322 are formed in a polygonal shape, and the and the first extending light-shielding portion 211 and the second extending light-shielding portion 212 are formed in a polygonal shape.

Figure 14A:
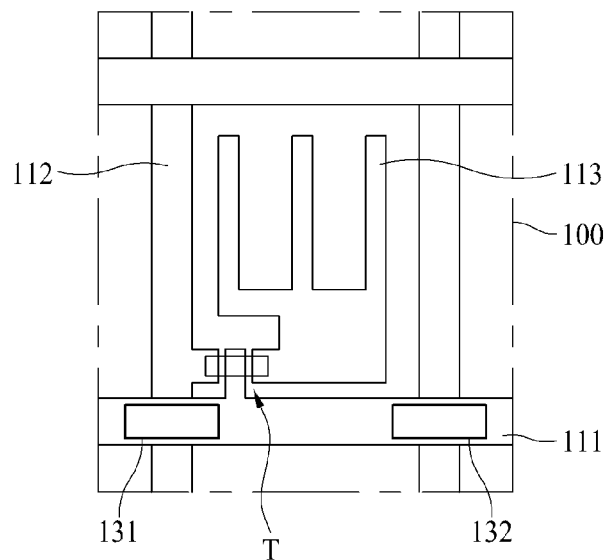
FIG. 14A is a plane view illustrating a first substrate of the liquid crystal display device according to another example embodiment of the present invention.
Figure 14B:
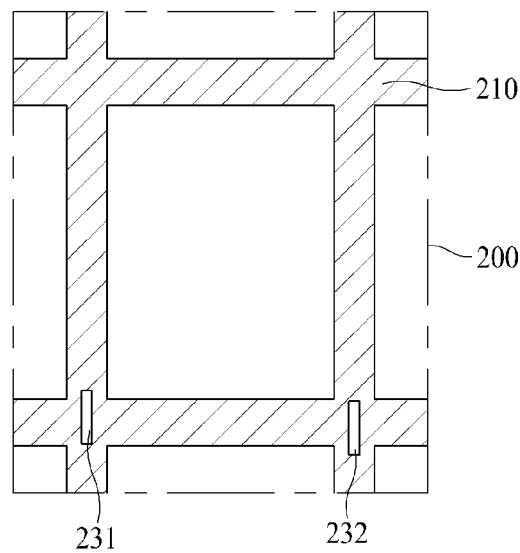
FIG. 14B is a plane view illustrating a second substrate of the liquid crystal display device according to another example embodiment of the present invention.
Figure 14C:
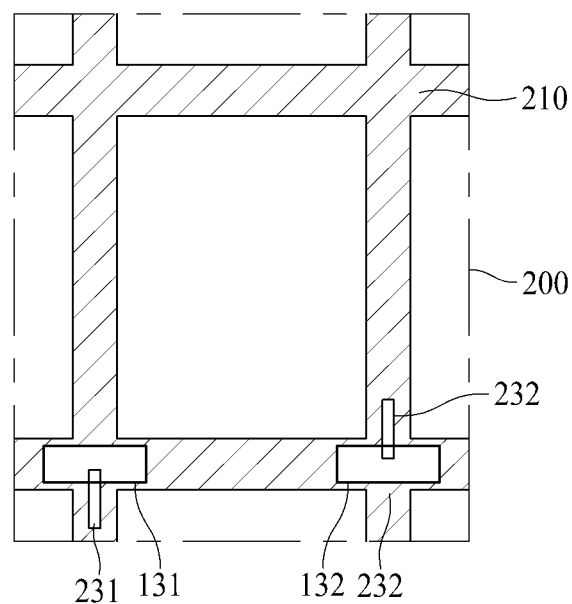
FIG. 14C is a plane view illus- trating a figure of overlap between a protrusion and a bump in the liquid crystal display device according to another example embodiment of the present invention.

FIG. 14A is a plane view illustrating a first substrate 100 of a liquid crystal display device according to another example embodiment of the present invention, FIG. 14B is a plane view illustrating a second substrate 200 of the liquid crystal display device according to another example embodiment of the present invention, and FIG. 14C is a plane view illustrating a figure of overlap between protrusions 231 and 232 and bumps 131 and 132 in the liquid crystal display device according to another example embodiment of the present invention.

As shown in FIG. 14A, a first bump 131 having a bar structure and a second bump 132 having a bar structure are formed on a first substrate 100. As shown in FIG. 14B, a first protrusion 231 having a bar structure and a second protrusion 232 having a bar structure are formed on a second substrate 200.

The first and second bumps 131 and 132 are overlapped with a gate line 111 on the first substrate 100, and the first and second protrusions 231 and 232 are overlapped with a data line 112 on the first substrate 100.

As shown in FIG. 14C, one side of the first protrusion 231 is overlapped with the other side of the first bump 131, and the other side of the first protrusion is not overlapped with the first bump 131. Also, one side of the second protrusion 232 is overlapped with one side of the second bump 132, and the other side of the second protrusion 232 is not overlapped with the second bump 132.

Meanwhile, although not shown, in case of the liquid crystal display device shown in FIGS. 12A to 12C, FIGS. 13A to 13C and FIGS. 14A to 14C, the first bump 131 and the second bump 132 are connected with each other by the connection portion (See '133' of FIGS. 7, 9 and 11), whereby the first bump 131, the connection portion 133 and the second bump 132 are connected as one body.

According to the present invention, when the protrusion formed on the second substrate is moved by the external force, it is possible to prevent the alignment film formed on the first substrate from being damaged by the protrusion.

Also, the overlapping area between the bump and the protrusion is decreased in size so that the liquid crystal layer surrounding the protrusion is easily restored after disappearance of the external force.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   first and second substrates;
   a liquid crystal layer between the first and second substrates;
   gate and data lines on the first substrate, the gate line being in a first direction, and the data line being in a second direction;
   first and second bumps on the first substrate;
   at least one first protrusion facing the first bump, and at least one second protrusion facing the second bump, the first and second protrusions being on the second substrate; and
   an alignment film between the first bump and the first protrusion, and between the second bump and the second protrusion,
   wherein the at least one first protrusion faces one side of the first bump, and the at least one second protrusion faces the other side of the second bump,
   wherein the alignment film includes a first alignment film covering the first bump and the second bump, and a second alignment film covering the at least one first protrusion and the at least one second protrusion, and a portion of the first alignment film corresponding to the first bump and the second bump contacts a portion of the second alignment film corresponding to the at least one first protrusion and the at least one second protrusion,
   wherein the first bump includes a first bar extending in a length direction of the gate line, the first bar overlapping the gate line,
   wherein the second bump includes a second bar extending in the length direction of the gate line, the second bar overlapping the gate line, and
   wherein the at least one first protrusion is smaller in size than the first bump and has a dot structure overlapped with the first bump, and the at least one second protrusion is smaller in size than the second bump and has a dot structure overlapped with the second bump.

2. The liquid crystal display device according to claim 1, wherein the first bump further includes a first extending portion extending from one side and from the other side of the first bar, and the second bump further includes a second extending portion extending from one side and from the other side of the second bar, and
   wherein the at least one first protrusion is overlapped with the first extending portion extending from the one side of the first bar, and the at least one second protrusion is overlapped with the second extending portion extending from the other side of the second bar.

3. The liquid crystal display device according to claim 2, further comprising a light-shielding layer overlapping the gate and data lines, a first extending light-shielding portion overlapping the first extending portion of the first bump, and a second extending light-shielding portion overlapping the second extending portion of the second bump, the light-shielding layer, the first extending light-shielding portion and the second extending light-shielding portion being on the second substrate.

4. A liquid crystal display device, comprising:
   first and second substrates;
   a liquid crystal layer between the first and second substrates;
   gate and data lines on the first substrate, the gate line being in a first direction, and the data line being in a second direction;
   first and second bumps on the first substrate;
   at least one first protrusion facing the first bump, and at least one second protrusion facing the second bump, the first and second protrusions being on the second substrate; and
   an alignment film between the first bump and the first protrusion, and between the second bump and the second protrusion,
   wherein the at least one first protrusion faces one side of the first bump, and the at least one second protrusion faces the other side of the second bump,
   wherein the alignment film includes a first alignment film covering the first bump and the second bump, and a second alignment film covering the at least one first protrusion and the at least one second protrusion, and a portion of the first alignment film corresponding to the first bump and the second bump contacts a portion of the second alignment film corresponding to the at least one first protrusion and the at least one second protrusion,
   wherein the first bump includes a first bar extending in a length direction of the gate line, the first bar overlapping the gate line,
   wherein the second bump includes a second bar extending in the length direction of the gate line, the second bar overlapping the gate line,
   wherein the first bump further includes a first extending portion extending from one side of the first bar, and a first groove is at the other side of the first bar,
   the second bump further includes a second extending portion extending from the other side of the second bar, and a second groove is at one side of the second bar, and
   the at least one first protrusion is overlapped with the first extending portion extending from the one side of the first bar, and the at least one second protrusion is overlapped with the second extending portion extending from the other side of the second bar.

5. The liquid crystal display device according to claim 4, wherein the first and second protrusions include a bar structure extending in a length direction of the data line, the first and second protrusion overlapping the data line, one portion of the at least one first protrusion is overlapped with the first extending portion, and another portion of the at least one first protrusion is not overlapped with the first extending portion, and one portion of the at least one second protrusion is overlapped with the second extending portion, and another portion of the at least one second protrusion is not overlapped with the second extending portion.

6. The liquid crystal display device according to claim 4, further comprising a light-shielding layer overlapping the gate and data lines, a first extending light-shielding portion overlapping the first extending portion of the first bump, and a second extending light-shielding portion overlapping the second extending portion of the second bump, the light-shielding layer, the first extending light-shielding portion and the second extending light-shielding portion being on the second substrate.

7. The liquid crystal display device according to claim 1, wherein the first bump and the second bump are connected with each other by a connection portion.

8. The liquid crystal display device according to claim 1, wherein the first bump and the at least one first protrusion maintain a cell gap of the liquid crystal layer, and the second bump and the at least one second protrusion maintain the cell gap of the liquid crystal layer.

9. The liquid crystal display device according to claim 1, wherein one side of the first bump and the other side of the second bump are in combination with one among a combination of the left side with respect to the center of the first bump and the right side with respect to the center of the second bump, a combination of the right side with respect to the center of the first bump and the left side with respect to the center of the second bump, a combination of the upper side with respect to the center of the first bump and the lower side with respect to the center of the second bump, a combination of the lower side with respect to the center of the first bump and the upper side with respect to the center of the second bump, a combination of the lower left side with respect to the center of the first bump and the upper right side with respect to the center of the second bump, a combination of the upper left side with respect to the center of the first bump and the lower right side with respect to the center of the second bump, a combination of the lower right side with respect to the center of the first bump and the upper left side with respect to the center of the second bump, or a combination of the upper right side with respect to the center of the first bump and the lower left side with respect to the center of the second bump.

10. A liquid crystal display device comprising:
a liquid crystal layer between first and second substrates;
a structure fixed to each of the first and second substrates, the structure being between the first and second substrates; and
an alignment film on at least one among the first and second substrates,
wherein the structure maintains a cell gap between the first and second substrates and reduces a damage of the alignment film even when the structure is affected by an external force,
wherein the structure includes a first structure having a first bump and a first protrusion,
wherein the alignment film is provided between the first bump and the first protrusion,
wherein the alignment film includes a first alignment film covering the first bump and a second alignment film covering the first protrusion, and a portion of the first alignment film corresponding to the first bump contacts a portion of the second alignment film corresponding to the first protrusion,
wherein the first bump includes a first bar extending in a first direction, and
wherein the first protrusion is smaller in size than the first bump and has a dot structure overlapped with the first bump.

11. The liquid crystal display device according to claim 10, wherein the structure further includes a second structure, the first structure and the second structure being different from each other.

12. The liquid crystal display device according to claim 11,
wherein the first bump is fixed to the first substrate, and the first protrusion is fixed to the second substrate, and
the second structure includes a second bump fixed to the first substrate, and a second protrusion fixed to the second substrate,
wherein the alignment film is further provided between the second bump and the second protrusion.

13. The liquid crystal display device according to claim 12, wherein the first and second structures are configured such that the second protrusion is maintained on the second bump if the first protrusion is dislodged from the first bump by the external force.

14. The liquid crystal display device according to claim 2, further comprising a light-shielding layer overlapping the gate and data lines, the light-shielding layer including a first extending light-shielding portion and a second extending light-shielding portion,
wherein the first extending light-shielding portion corresponds to the first extending portion of the first bump, and
wherein the second extending light-shielding portion corresponds to the second extending portion of the second bump.

15. The liquid crystal display device according to claim 2, further comprising a light-shielding layer overlapping the gate and data lines, the light-shielding layer including a first extending light-shielding portion and a second extending light-shielding portion,
wherein the first bump, the second bump, the first protrusion and the second protrusion are overlapped with the light-shielding layer, the first extending light-shielding portion, and the second extending light-shielding portion.

16. The liquid crystal display device according to claim 2, wherein the one portion of the at least one first protrusion is overlapped with one side of the first bump, and
wherein the first extending portion extends from one side of the first bar, and another portion of the first protrusion is not overlapped with the first bump.

17. The liquid crystal display device according to claim 2, wherein the one portion of the at least one second protrusion is overlapped with one side of the second bump, and
wherein the second extending portion extends from the opposite side of the second bar, and another portion of the second protrusion is not overlapped with the second bump.

18. A liquid crystal display device comprising:
a liquid crystal layer between first and second substrates;
a structure between the first and second substrates, the structure including a first structure having a first bump and a first protrusion; and
an alignment film between the first bump and the first protrusion, wherein the alignment film includes a first alignment film covering the first bump and a second alignment film covering the first protrusion, and a portion of the first alignment film corresponding to the first bump contacts a portion of the second alignment film corresponding to the first protrusion, wherein the first bump includes a first bar extending in a first direction and a first extending portion extending from one side of the first bar, and a first groove is at the other side of the first bar, and wherein the first protrusion is overlapped with the first extending portion extending from the one side of the first bar.

\* \* \* \* \*